United States Patent
Tuggle

[11] 3,715,139
[45] Feb. 6, 1973

[54] SHOCK ABSORBING BUMPER
[75] Inventor: Robert E. Tuggle, Saginaw, Mich.
[73] Assignee: General Motors Corporation, Detroit, Mich.
[22] Filed: Aug. 12, 1971
[21] Appl. No.: 171,238

[52] U.S. Cl. ....................293/70, 188/268, 213/43, 213/221, 213/140, 293/85, 293/88, 293/89
[51] Int. Cl. ........B60r 19/02, B61f 19/04, F16f 9/30
[58] Field of Search.......188/1 B, 1 C, 1 D, 268, 317; 213/43, 221, 222; 267/139, 140; 293/70, 85, 88, 89

[56] References Cited

UNITED STATES PATENTS

| | | | |
|---|---|---|---|
| 1,648,394 | 11/1927 | Gates | 293/85 |
| 3,053,526 | 9/1962 | Kendall | 188/268 X |
| 3,379,317 | 4/1968 | Carlson | 188/268 X |

Primary Examiner—Drayton E. Hoffman
Assistant Examiner—Howard Beltran
Attorney—W. E. Finken et al.

[57] ABSTRACT

An energy absorbing support unit adapted to mount a bumper bar on a vehicle frame for bodily movement through a predetermined stroke in response to impacts thereon, the support unit including a mounting tube rigidly affixed to the frame, a support tube of length substantially exceeding the bumper stroke and telescopically supported on the mounting tube, a pressure chamber of length generally equal to the bumper stroke filled with a combined damping and spring return medium and rigidly attached to the support tube, and an orificed piston and piston rod assembly slidably supported on the pressure chamber and connected to the mounting tube. Under impact, the pressure chamber and support tube are forced rearward relative to the piston and rod so that the damping and return medium is extruded through the piston for damping and compressed by the rod for effecting restoration of the support tube after impact.

4 Claims, 6 Drawing Figures

INVENTOR.
Robert E. Tuggle
BY
Saul Schwartz
ATTORNEY

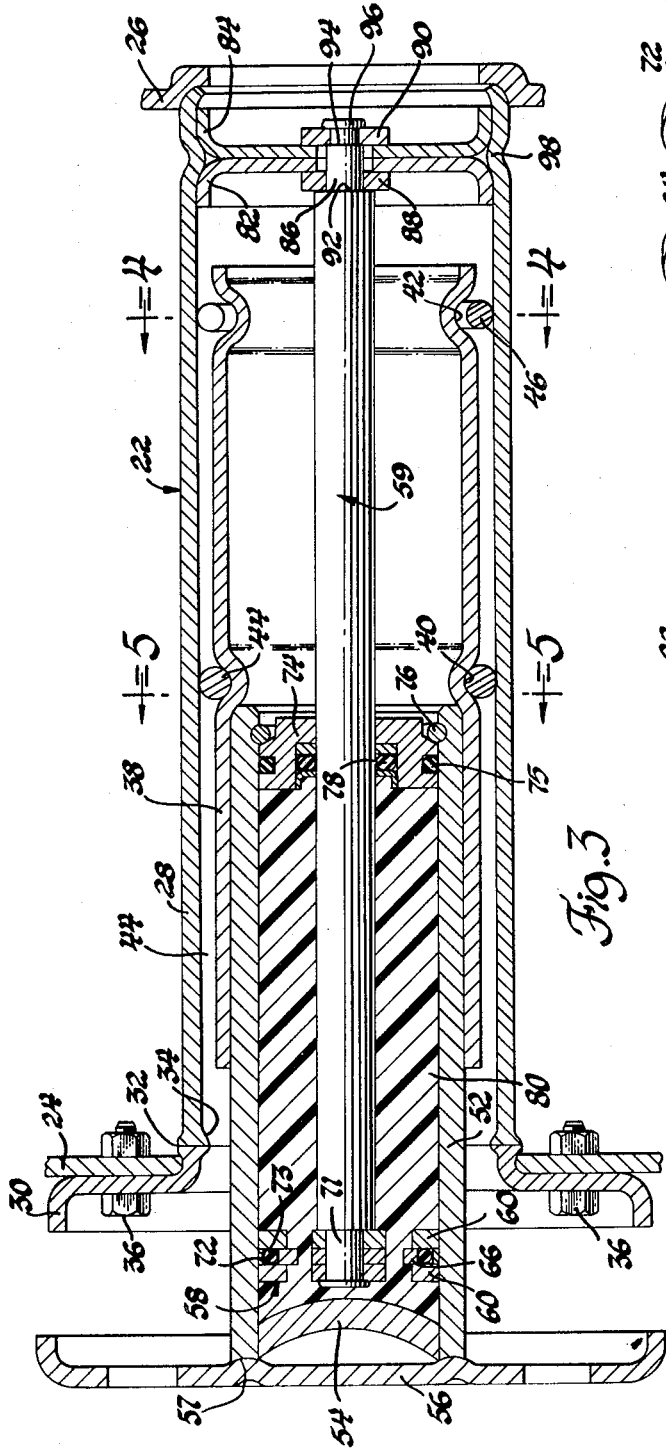
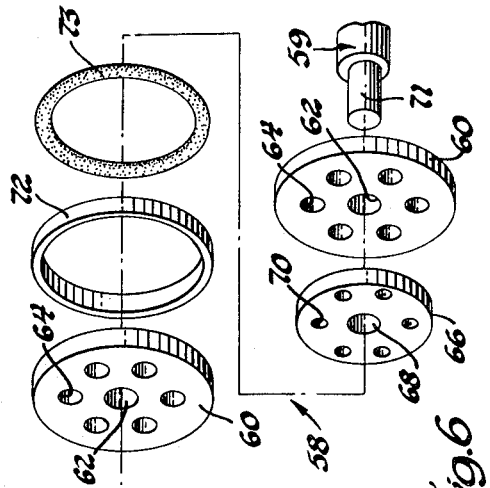
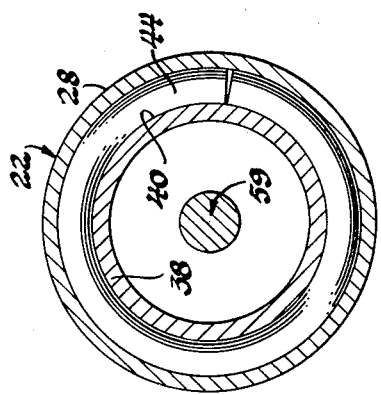
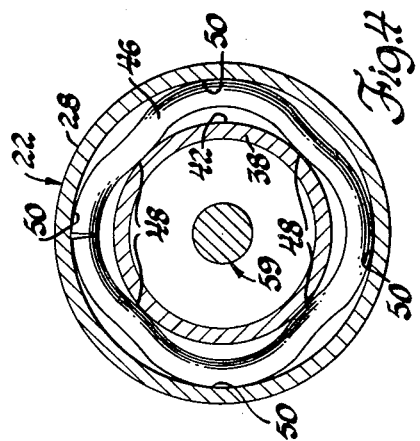

SHOCK ABSORBING BUMPER

This invention relates generally to energy absorbing devices and in particular to an energy absorbing support unit adapted to connect a bumper bar to a vehicle frame.

It has been suggested that damage to sheet metal portions of a vehicle body, such as fenders or the like, resulting from relatively low speed collisions with other vehicles can be significantly reduced by absorbing the energy of impact before contact is made with the sheet metal portions. One way to effect this result is to dispose an energy absorbing device between the bumper and the frame of the vehicle so that impact forces on the bumper cause bodily movement of the latter relative to the frame through a predetermined stroke against a resisting force, the movement of the force through the particular stroke, of course, resulting in absorption of the energy of impact. Accordingly, numerous design proposals concerning such energy absorbing devices have been made, some incorporating the bumper supporting means and the energy absorbing device into a single energy absorbing bumper support unit. In very high volume production applications, however, the cost of each unit is a matter of critical importance and it is in this respect that virtually all of the heretofore known designs have proven unsatisfactory. That is, when any of the heretofore known designs are actually dimensioned to meet the severe durability and performance standards imposed by the automobile manufacturers, the cost of each unit becomes unsatisfactorily high. An energy absorbing bumper support unit according to this invention represents an improvement over heretofore known designs in that it is capable of meeting the most severe performance and durability standards at a reduced unit cost through a novel arrangement of relatively simple and inexpensive parts.

The primary feature, therefore, of this invention is that it provides an improved energy absorbing unit particularly adapted for disposition between a bumper bar and a vehicle frame. Another feature of this invention is that it provides an improved energy absorbing unit adapted to support the bumper bar on the frame including a stationary mounting tube on the frame and a support tube attached to the bumper bar and disposed telescopically with respect to the mounting tube, the support tube being substantially longer than the stroke experienced by the bumper bar upon impact and projecting well into the mounting tube to maximize lateral and vertical rigidity. Still another feature of this invention resides in the provision of a high strength pressure chamber rigidly attached to the support tube having a length substantially equal to only the stroke of the bumper bar, the chamber slidably supporting an orificed piston rigidly connected to the mounting tube and being filled with a compressible semi-solid working medium adapted to be extruded through the piston orifices under very high pressure to effect energy absorption throughout the stroke of the bumper and to exert a restoring force effecting return of the bumper bar to its original position after impact. Other features of this invention reside in the provision of a pair of axially spaced front and rear bearing rings disposed between the mounting and the support tubes and in the provision of an abutment on the outboard end of the mounting tube, the front bearing ring being adapted for wedging engagement between the abutment and a ramp surface on the support tube to eliminate lateral and vertical looseness in the unit at the front support when the bumper bar is fully extended and the rear bearing ring being radially resilient to accommodate tolerance buildup within the unit while maintaining substantial lateral and vertical rigidity at the rear support. A still further feature of this invention resides in the provision of an axially rigid but laterally and vertically floating connection between the mounting tube and the piston rod attached to the orificed piston, the floating connection accommodating minor misalignment between the axis of the rod and the path of motion traversed by the pressure chamber to prevent binding of the piston in the chamber. Yet another feature of this invention resides in the method by which a preload is effected in the assembled support unit, the preload maintaining the bumper bar in an extended position except under impacts exceeding a predetermined minimum magnitude.

These and other features of this invention will be readily apparent from the following specification and from the drawings wherein:

FIG. 3 is similar to FIG. 2 but showing the support unit in a retracted condition;

FIG. 4 is a sectional view taken generally along the plane indicated by lines 4—4 in FIG. 3;

FIG. 5 is a sectional view taken generally along the plane indicated by lines 5—5 in FIG. 3; and FIG. 6 is an exploded perspective view of the composite piston portion of the support unit.

Figure 1:
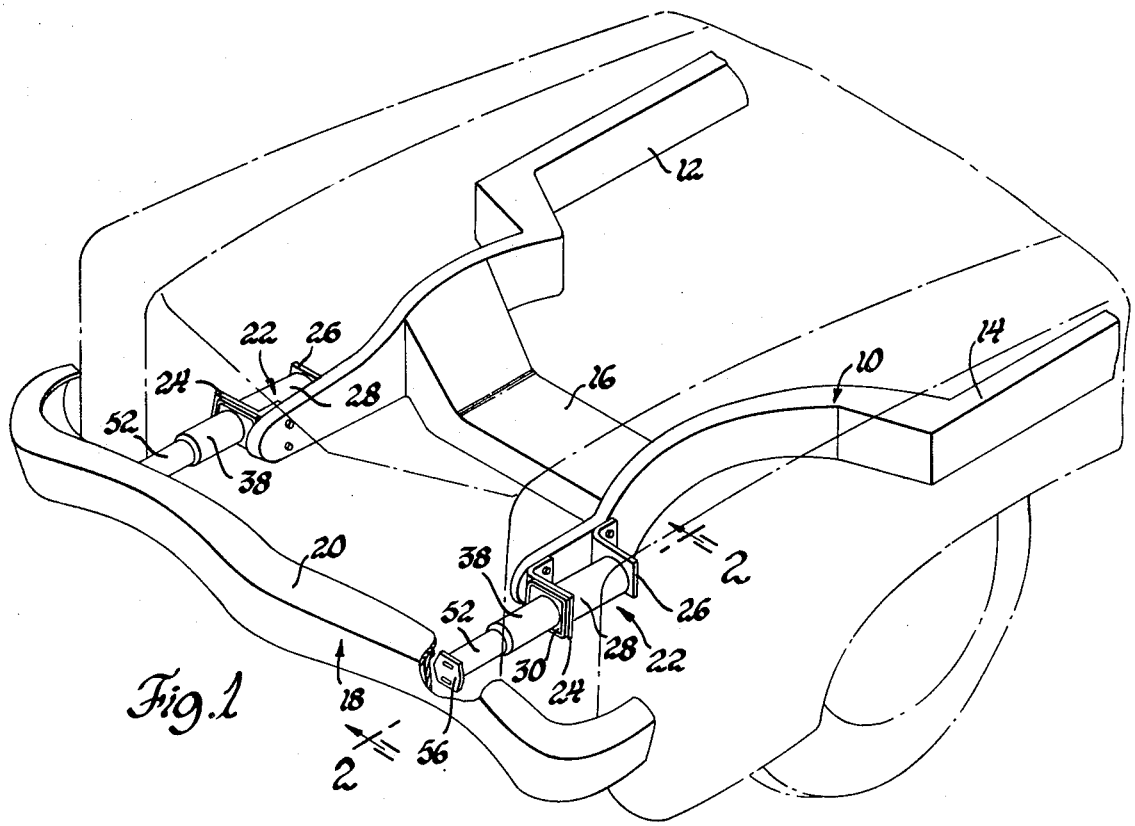
FIG. 1 is a perspective view of the forward portion of an automobile frame having a collision bumper structure supported thereon by a pair of energy absorbing support units according to this invention.

Referring now to FIG. 1 of the drawings, there is shown in simplified form an automobile frame designated generally 10 including a pair of longitudinally extending side rails 12 and 14, the side rails being interconnected at the forward end of the frame by a rigid cross member 16. A collision bumper structure 18 including a bumper bar 20 is supported on the frame by a pair of identical energy absorbing support units according to this invention and designated generally 22, each support unit being rigidly attached to the corresponding one of the frame rails 12 and 14 by a front bracket 24 and a rear bracket 26 each bolted to the frame rails. It will be understood, of course, that rather than the separate frame illustrated herein, the support units according to this invention are equally well adapted for use with unibody vehicle constructions.

Figure 2:
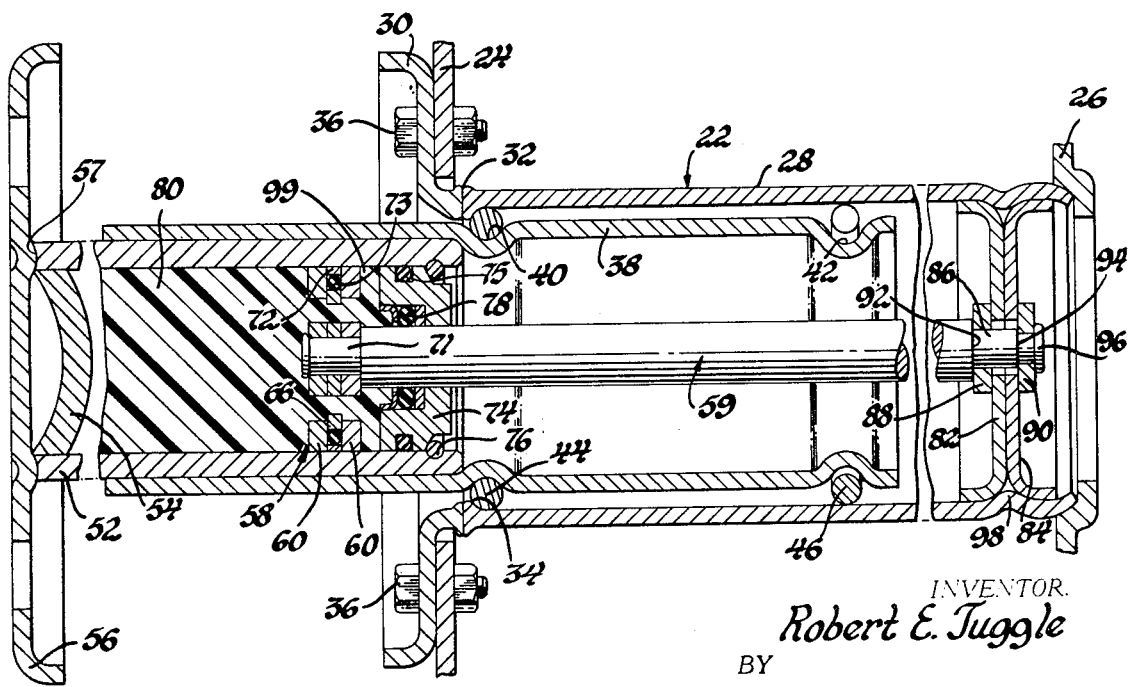
FIG. 2 is an enlarged sectional view taken generally along the plane indicated by lines 2—2 in FIG. 1 and showing the support unit in an extended condition.

Referring now to FIGS. 2 and 3, each support unit 22 is adapted for assembly remote from the vehicle and may be installed in a fully preloaded condition on the latter at any convenient time during assembly of the vehicle. Each support unit 22 includes a cylindrical mounting tube 28 which may be a section of standard commercially available steel tubing cut to a predetermined length. A flange 30 having a central aperture therein having a diameter generally equal to the inner diameter of the mounting tube 28 is butt welded to the forward end of the mounting tube at 32, the weld creating an upset between the flange and the tube which forms an annular abutment 34 projecting inwardly from the inner diameter of the tube. The flange 30 is adapted for rigid connection to the front bracket 24 by a plurality of threaded fasteners 36.

Referring again to FIGS. 2 and 3, each support unit 22 further includes a cylindrical support tube 38 which may also be a section of standard commercially available steel tubing cut to a predetermined length. The support tube is telescopically disposed within the mounting tube 28 and has formed therein a pair of axially spaced annular grooves 40 and 42, the latter groove being situated adjacent the rear end of the tube. As seen best in FIGS. 2, 3 and 5, a combination bearing and retaining member in the form of a split ring 44 having a circular cross section is received within the annular groove 40. The thickness or cross sectional diameter of the split ring is less than one-half the difference between the inside diameter of mounting tube 28 and the outside diameter of support tube 38 at the deepest portion of the groove 40 so that the split ring functions as a relatively loose bearing member during relative telescopic movement between the mounting and the support tubes. As seen best in FIGS. 2, 3 and 4, a combination bearing and stabilizing ring in the form of a rippled split ring 46 is received within the annular groove 42 and contacts the support tube 38 at four angularly spaced locations designated 48. Similarly, the rippled ring 46 contacts the inside of mounting tube 28 at four angularly spaced locations designated 50 angularly offset from contact locations 48. The rippled ring functions as a relatively stiff spring maintaining the rear end of support tube 38 centered within the mounting tube 28 and strongly resisting lateral deflection of the support tube. The rippled ring also functions as a second bearing element between the mounting and support tubes during relative telescopic movement therebetween.

Referring to FIGS. 1 and 2, a short pressure tube 52 fabricated from relatively expensive high strength material is received in the forward end of support tube 38 and is rigidly attached to the latter by a press fit between the outer diameter of the pressure tube 52 and the inner diameter of the support tube 38. The outboard end of the pressure tube is closed by a hemispherically shaped circular Welch plug 54 and a mounting flange 56 adapted for connection to the bumper bar 20 is butt welded to the pressure tube at 57 outboard of the Welch plug.

As seen best in FIGS. 2, 3, and 6, the pressure tube 52 slidably receives a composite piston 58 mounted on the end of a piston rod 59. The piston 58 includes two plate members 60 each having a central aperture 62 and an array of large orifices 64. The piston 58 further includes a third plate member 66 having a central aperture 68 and an array of small orifices 70. Each of the plate members is adapted for economical mass production manufacture, as by stamping, and the three are sandwiched together with the orifices 64 and 70 in register and with the apertures 62 and 68 in alignment for reception on and rigid attachment to a reduced diameter end portion 71 of the piston rod 59. A sealing ring 72 reinforced by a backup ring 73 is disposed around plate member 66 between the plate member 60 for a purpose more fully explained hereinafter.

A cap 74 having an anti-extrusion ring 75 thereon is sealingly received within the bore of the pressure tube 52 and is retained thereon by a retaining ring 76. The cap 74 has mounted thereon a seal 78 and slidably and sealingly supports the piston rod 59. The closed pressure chamber thus formed by the pressure tube 52, the Welch plug 54, and the cap 74 is completely filled with a commercially available combined damping and spring return medium, 80. The physical characteristics of the medium 80 are such that when the piston rod 59 is forced leftwardly, FIGS. 2 and 3, into the pressure chamber with corresponding bodily movement of the composite piston 58, the medium is extruded or throttled through the registered orifices 64 and 70 under high pressure while the volume occupied by the medium is reduced due to the increasing volume occupied by the piston rod. Coincident with the decrease in volume occupied by the medium 80 is a substantial increase in the internal pressure of the medium which is exerted against the pressure tube, the Welch plug, and the differential area of the composite piston. The Welch plug functions to transfer a portion of the pressure exerted thereon to the hoop strength of the cylinder to prevent distortion of the relatively soft mounting flange 56 which would occur if the pressure tube were closed only by the mounting flange. The sealing ring 72 and the reinforcing ring 73 function to prevent the extrusion of any of the medium around the piston 58. When the force initiating inward movement of the piston rod ceases, the pressure exerted on the differential area of the composite piston by the medium forces withdrawal of the piston rod from the pressure chamber and effects reverse extrusion of the medium through the registered orifices.

As seen best in FIGS. 2 and 3, a pair of cup-shaped retainers 82 and 84, adapted to be secured to the mounting tube 28 as described hereinafter, are loosely received in opposed relationship on a second reduced diameter end portion 86 of the piston rod 59. A pair of washers 88 and 90 are received on the piston rod 59 on opposite sides of the opposed retainers and abut respective ones of a pair of shoulders 92 and 94 on the piston rod, the shoulder 94 preventing the washers from squeezing the retainers therebetween. The retainers 82 and 84 and the washers 88 and 90 are retained on the piston rod by a rolled-over end 96 of the latter so that the retainers are relatively free to float laterally while being bodily movable longitudinally as a unit with the rod.

During the assembly of each support unit 22 a preload is effected which functions, when the unit is installed on the vehicle, to maintain the bumper bar 20 immovable under the influence of relatively low magnitude impacts. In assembling the support unit, the mounting tube 28 is held stationary with the support tube 38 telescopically disposed therein as described hereinbefore, the pressure tube 52 and mounting flange 56 being attached to the support tube with the pressure chamber being open at the rear end. A predetermined quantity of medium 80 is introduced into the chamber and the piston 58, connected to the rod 59 which has the retainers 82 and 84 thereon, is received within the pressure tube behind the medium. The pressure tube is then sealingly closed by the cap 74 which is retained by the retaining ring 76.

Following the sealing of the pressure tube, a force is exerted on the piston rod urging the latter leftwardly, FIG. 2. The force on the piston rod initially urges both the rod and the support tube leftwardly until split ring 44 is captured between the abutment 34 on the mounting tube and the ramp surface formed by the back side of groove 40 on the support tube whereupon continued application of force effects leftward movement of the piston and the piston rod into the pressure chamber and compression of the medium. When the piston 58 separates from the cap 74 and the compressed medium 80 circulates on both sides of the piston, the pressure acting on the differential area of the latter gives rise to a force on the rod resisting further penetration and to a reaction force on the pressure chamber and the support tube urging leftward extension of the latter out of the mounting tube. Such extension is, however, limited to an extended position of the support tube, FIG. 2, by split ring 44 which radially expands with increasing pressure in the pressure chamber until all lateral and vertical looseness between the mounting and support tubes at the front bearing is taken up. After all looseness is eliminated, further pressure increase in the pressure chamber resulting from continued penetration of the piston rod 59 only increases the magnitude of the force transmitted from the support tube, through the split ring, to the mounting tube. When the resistance to penetration into the pressure chamber experienced by the rod achieves a predetermined magnitude equal to the desired unit preload, a forming tool, not shown, is activated to effect annular deformation of the mounting tube 28 around the opposed retainers 82 and 84 such that an annular ridge 98, FIG. 2, is formed between the retainers to prevent axial bodily movement thereof relative to the mounting tube. With the piston rod thus axially rigidly joined to the mounting tube, the preload force is captured within the support unit so that the latter may be stored or shipped in the preloaded condition ready for installation on the vehicle at any convenient time.

From the foregoing description, it will be apparent to those skilled in the art that the position of the piston 58 with respect to the cap 74 has a direct effect on the overall characteristics of the fully assembled support unit. More particularly, referring to FIG. 2, if during assembly of the support unit an abnormally large quantity of medium 80 is placed in the pressure chamber, the desired preload force may be achieved merely by the installation of the piston, the rod, and the cap as described without further penetration of the rod into the chamber. Under these circumstances the piston would abut the cap and no wedging or radial expansion of the split ring 44 would be effected. Absent such wedging, the lateral and vertical looseness between the mounting and the support tubes at the front bearing is not taken up with the result being that the unit might be subjected to rattling or vibration in service, the energy absorbing capability of the unit, of course, not being effected at all by such looseness. If, however, the piston rod penetrates sufficiently into the pressure chamber during preloading to effect separation between the piston 58 and the cap 74, FIG. 2, the desirable wedging of the split ring results. Accordingly, it is preferred that when the support unit is fully assembled, there be a space or gap 99 between the piston and the cap so that the unit is virtually completely rattle-free and thus insensitive to vibrations which might be encountered in service.

It will be further apparent to those skilled in the art that the described method of assembling the support unit makes possible the assembly of a large number of support units having uniform characteristics without the necessity of using a correspondingly large number of uniform components. More particularly, since the actual location of annular ridge 98 depends only upon when the desired preload is achieved, manufacturing tolerances accumulating in the unit, environmental conditions, and small variations in the quantity of medium used are all compensated for simply and effectively. Thus, regardless of the existence of these variations, the fully assembled support units will all be virtually completely rattle-free and preloaded to a very uniform level.

When each support unit 22 is installed on the vehicle with flange 30 rigidly attached to bracket 24, mounting flange 42 rigidly attached to the bumper bar 20 and the rear end of mounting tube 28 rigidly attached to bracket 26, forces exerted on the bumper bar of magnitude less than the unit preload are ineffective to actuate the support unit and the bumper bar 20 thus functions as a conventional rigid structure with respect to the low magnitude impacts. The support tube 38, being substantially longer than the anticipated stroke of the unit projects well into the mounting tube and is laterally and vertically supported by the wedgingly captured split ring 44 and the rippled ring 46 so that the entire bumper structure is laterally and vertically stable with respect to the frame of the vehicle. If, however, forces are encountered which exceed the unit preload, the pressure tube 52 and support tube 38 are forced telescopically rearward relative to the mounting tube 28 from the extended position, FIG. 2, to a retracted position, FIG. 3. During this telescopic movement, the split ring 44 and rippled ring 46 function as bearing elements permitting smooth sliding movement of the support tube relative to the mounting tube while the floating connection between the piston rod end portion 86 and the retainers 82 and 84 accommodates any minor misalignment. Simultaneously, the medium 80 is extruded through the composite piston 58 under very high pressure to effect absorption of the energy of impact while the piston rod 59 effects compression of the working medium. When the impact on the bumper bar ceases, the medium 80 initiates withdrawal of the piston rod 59 from the pressure chamber to effect extension of the support tube 38 relative to the mounting tube 28, the extension continuing until split ring 44 is once again wedgingly captured between the abutment 34 and the groove 40.

It will be apparent to those skilled in the art that the provision of separate pressure and support tubes makes possible substantial cost savings. That is, to achieve both the required lateral and vertical stability and strength to accommodate the high pressures to which the medium is subjected, it has heretofore been the practice to employ a single, very long and expensive pressure tube, the length of the tube substantially exceeding the stroke of the support unit so that only a portion of the tube is used for its main purpose of containing the pressurized medium. By using a pressure tube substantially only as long as the stroke of the unit and replacing the rest by a relatively inexpensive commercial grade tube, a very significant cost reduction is effected.

Having thus described the invention, what is claimed is:

1. In an automotive vehicle bumper system including an impact bumper and a bumper mounting unit adapted for telescopic deflection in an energy absorbing mode between an extended condition wherein said impact bumper is located in a normal position and a retracted condition wherein said impact bumper is displaced toward said vehicle, said mounting unit being of the type including a high tensile strength pressure tube filled with a compressible combined damping and return spring medium subject during impact telescopic deflection of said mounting unit from the extended condition to the retracted condition thereof to develop high internal pressure in said medium and high hoop tension force in said pressure tube, the improvement which comprises, said pressure tube being of a length equalling substantially only the amount of telescopic deflection of said mounting unit between the extended and the retracted conditions thereof, an outer mounting tube adapted for rigid attachment to the vehicle, a support tube including a first portion having fixedly attached thereto said pressure tube and a second portion extended from said first portion and located within said mounting tube, means attaching said impact bumper to one of said pressure tube and said support tube, bearing means disposed between said support tube and said mounting tube supporting the former on the latter in firm cantileverlike fashion and for telescopic bodily movement relative thereto between an extended position and a retracted position corresponding respectively to the extended and the retracted conditions of said support unit, a piston rod slidably extending into said pressure tube, means connecting said piston rod to said mounting tube and operative to restrain the former against axial bodily movement relative to the latter, a piston slidably disposed in said pressure tube and defining a flow orifice for said medium, and means rigidly attaching said piston to said piston rod, said medium being adapted for throttled flow through said orifice during telescopic movement of said support tube from the extended to the retracted position thereof thereby to effect energy absorption and for compression by said piston rod thereby to exert on the latter a force urging restoration of said support tube to the extended position thereof.

2. A support unit adapted to normally rigidly support an impact bumper bar on a vehicle in an extended position under a preload and to deflect through a predetermined stroke in an energy absorbing mode in response to an impact on said bumper bar exceeding said preload comprising, in combination, a mounting tube adapted for rigid attachment to said vehicle, a support tube having a length substantially exceeding the stroke of said support unit and adapted for rigid connection to said bumper bar, said support tube being telescopically disposed on said mounting tube, means defining an annular ramp surface on said support tube intermediate the ends thereof, a split ring disposed between said support tube and said mounting tube outboard of said ramp surface and movable as a unit with said support tube, a bearing ring disposed between said support tube and said mounting tube in axially spaced relation to said split ring, said split ring and said bearing ring cooperating in mounting said support tube on said mounting tube in firm cantilever-like fashion and for telescopic bodily movement relative to said mounting tube during the stroke of said support unit between an extended position corresponding to the extended position of said bumper bar and a retracted position, a high strength pressure tube having a length equalling substantially only the stroke of said support unit, means rigidly attaching said pressure tube to said support tube, a piston rod disposed in said support tube and having a first end slidably extending into said pressure tube and a second end projecting into said mounting tube, means connecting said second end of said piston rod to said mounting tube and restraining said piston rod against axial bodily movement relative to said mounting tube, a piston slidably disposed in said pressure tube and defining an orifice, means rigidly connecting said piston to said piston rod, a combined damping and restoring medium disposed in said pressure tube under substantial initial internal pressure and adapted for throttled flow through said orifice thereby to effect energy absorption during movement of said support tube from the extended to the retracted position and for compression by said piston rod thereby to exert on the latter a force urging restoration of said support tube to the extended position thereof, the initial internal pressure of said medium effecting a preload on said support unit by urging said support tube toward a position beyond the extended position thereof, and means defining an annular abutment on said mounting tube engageable on said split ring and operative to block unitary movement thereof with said support tube when the latter achieves the extended position, said ramp surface thereafter effecting radial deflection of said split ring under the influence of the initial internal pressure thereby to eliminate lateral and vertical looseness between said support tube and said mounting tube at said split ring.

3. A support unit adapted to normally rigidly support an impact bumper bar on a vehicle in an extended position and to deflect through a predetermined stroke in an energy absorbing mode in response to a substantial impact on said bumper bar comprising, in combination, a mounting tube adapted for rigid attachment to said vehicle, a support tube having a length substantially exceeding the stroke of said support unit and adapted for rigid connection to said bumper bar, means mounting said support tube on said mounting tube in firm cantilever-like fashion and for telescopic bodily movement relative to said mounting tube during the stroke of said support unit between an extended position corresponding to the extended position of said bumper bar and a retracted position, means defining a high strength pressure tube having a length equalling substantially only the stroke of said support unit, means rigidly attaching said pressure tube to said support tube, a piston rod disposed in said support tube and having a first end slidably extending into said pressure tube and a second end projecting into said mounting tube, means connecting said second end of said piston rod to said mounting tube in a manner restraining axial bodily movement of the former relative to the latter while permitting limited transverse displacement of said second end, a composite piston including a plurality of plate members each having a plurality of orifices adapted for registry with corresponding orifices in the other of said plates members thereby to provide a plurality of orifices through said composite piston, said composite piston being slidably disposed in said pressure tube and rigidly connected to said first end of said piston rod, and a combined damping and restoring medium disposed in said pressure chamber and adapted for throttled flow under high pressure through said orifices during movement of said support tube from the extended to the retracted position thereof thereby to effect energy absorption during the stroke of said support unit and for compression by said piston rod thereby to exert on the latter a force urging restoration of said support tube to the extended position thereof, said limited lateral displacement of said second end of said piston rod compensating for misalignment between said mounting tube and said pressure tube during telescopic deflection of said support unit thereby to prevent binding of said composite piston in said pressure tube.

4. In an automotive vehicle having an impact bumper bar, a support unit adapted to normally rigidly support said bumper bar on said vehicle in an extended position under a preload and to deflect through a predetermined stroke in an energy absorbing mode in response to an impact on said bumper bar exceeding said preload comprising, in combination, a mounting tube adapted for rigid attachment to said vehicle, a support tube having a length substantially exceeding the stroke of said support unit and adapted for rigid connection to said bumper bar, said support tube being telescopically disposed on said mounting tube, means defining a front annular groove in said support tube and a rear annular groove in said support tube spaced longitudinally from said front grove, one side of said front groove defining an annular ramp surface, a split ring disposed in said front groove between said support tube and said mounting tube and movable as a unit with said support tube, a rippled split ring disposed in said rear groove between said support tube and said mounting tube and movable as a unit with said support tube, said split ring and said rippled ring cooperating in mounting said support tube on said mounting tube in firm cantilever-like fashion and for telescopic bodily movement relative to said mounting tube during the stroke of said support unit between an extended position corresponding to the extended position of said bumper bar and a retracted position, means defining a high strength pressure tube having a length equalling substantially only the stroke of said support unit, means rigidly attaching said pressure tube to said support tube, a piston rod disposed in said support tube and having a first end slidably extending into said pressure tube and a second end projecting into said mounting tube, a pair of retainers slidably disposed in said mounting tube and connected to said second end of said piston rod for axial bodily movement as a unit with the latter and for limited transverse movement relative thereto, means operative to rigidly secure said retainers to said mounting tube thereby to prevent axial bodily movement of said piston rod relative to said mounting tube, a composite piston including a plurality of plate members each having a plurality of orifices adapted for registry with corresponding orifices in the other of said plate members thereby to provide a plurality of orifices through said composite piston, said composite piston being slidably disposed in said pressure tube and rigidly connected to said first end of said piston rod, a combined damping and restoring medium disposed in said pressure chamber under substantial initial internal pressure and adapted for throttled flow through said orifices during movement of said support tube from the extended to the retracted position thereof thereby to effect energy absorption during the stroke of said support unit and for compression by said piston rod thereby to exert on the latter a force urging restoration of said support tube to the extended position thereof, the initial internal pressure of said medium effecting a preload on said support unit by urging said support tube toward a position beyond the extended position thereof, and means defining an annular abutment on said mounting tube engageable on said split ring to block unitary movement thereof with said support tube when the latter achieves the extended position, said ramp surface thereafter effecting radial expansion of said split ring under the influence of said preload thereby to eliminate lateral and vertical looseness adjacent between said support tube and said mounting tube at said split ring.

* * * * *